(12) United States Patent
Shick et al.

(10) Patent No.: US 6,789,771 B1
(45) Date of Patent: Sep. 14, 2004

(54) VIDEO GAME CONTROLLER HOLSTER

(75) Inventors: Kevin S. Shick, Girard, PA (US); Michael J. Hronas, Erie, PA (US); Lawrence W. Palaszynski, West Seneca, NY (US); Bruce L. Brandow, Mayville, NY (US); Ernest J. Rammelt, Westfield, NY (US)

(73) Assignee: Hody Products, Inc., Westfield, NY (US)

( * ) Notice: Subject to any disclaimer, the term of this patent is extended or adjusted under 35 U.S.C. 154(b) by 0 days.

(21) Appl. No.: 10/106,659

(22) Filed: Mar. 26, 2002

(51) Int. Cl.⁷ .................................................. F16L 3/00
(52) U.S. Cl. ............... 248/121; 248/309.2; 248/222.41; 248/125.3; 211/59.1; 211/57.1; 273/148 R; 273/309
(58) Field of Search ..................... 248/121, 122.1, 248/126, 125.7, 27.8, 448, 346.01, 160, 309.2, 221.12, 222.41, 223.21, 220.31, 125.3; 211/75, 85.1, 88.01, 57.1, 59.1; 273/148 B, 309, 148 R; 224/673, 270, 320, 451, 501, 546, 547, 532, 929

(56) References Cited

U.S. PATENT DOCUMENTS

| | | | | |
|---|---|---|---|---|
| 1,013,551 A | * | 1/1912 | Horton .................... 248/311.2 |
| 1,679,675 A | * | 8/1928 | Lujan .......................... 248/160 |
| 1,783,749 A | * | 12/1930 | Roehl ............................ 248/97 |
| 2,007,496 A | * | 7/1935 | Hurlbut ...................... 248/27.8 |
| 2,100,421 A | * | 11/1937 | Wupper ....................... 273/265 |
| 2,890,801 A | * | 6/1959 | Ladd et al. ................ 211/59.1 |
| 3,140,558 A | * | 7/1964 | Cassidy ....................... 248/449 |
| 3,897,724 A | * | 8/1975 | McDonald ................... 100/34 |
| 3,915,308 A | * | 10/1975 | Ratzloff et al. ............ 211/70.6 |
| 4,223,862 A | * | 9/1980 | Doughty ................. 248/222.52 |
| 4,494,754 A | * | 1/1985 | Wagner, Jr. ............. 273/148 B |
| 4,501,369 A | * | 2/1985 | Fox ........................... 211/133.1 |
| D278,102 S | * | 3/1985 | Wagner, Jr. .................. D6/466 |
| D281,657 S | * | 12/1985 | Roczey ....................... D14/454 |
| 4,573,682 A | * | 3/1986 | Mayon ................... 273/148 B |
| 4,865,283 A | * | 9/1989 | Parker ......................... 248/159 |
| 4,889,304 A | * | 12/1989 | Glickman et al. ..... 248/222.13 |
| 4,936,565 A | * | 6/1990 | Fredrickson ............... 211/59.1 |
| 4,951,827 A | * | 8/1990 | Moransais ................. 211/59.1 |
| 5,031,783 A | * | 7/1991 | Goudreau ................ 211/181.1 |
| 5,060,393 A | * | 10/1991 | Silverman et al. ........... 33/512 |
| 5,207,791 A | * | 5/1993 | Scherbarth ............. 273/148 B |
| 5,490,599 A | * | 2/1996 | Tohidi ......................... 211/171 |
| 5,820,004 A | * | 10/1998 | Lane .......................... 224/485 |
| 6,044,772 A | * | 4/2000 | Gaudette et al. ............. 108/43 |
| 6,234,436 B1 | * | 5/2001 | Kump .................. 248/220.21 |
| 6,568,334 B1 | * | 5/2003 | Gaudette et al. ............. 108/43 |
| 6,575,315 B2 | * | 6/2003 | Zidek ......................... 211/205 |

* cited by examiner

*Primary Examiner*—Anita King
*Assistant Examiner*—Naschica S. Morrison
(74) *Attorney, Agent, or Firm*—Frank J. Catalano

(57) ABSTRACT

A holster for storing a video game controller has upward, downward, left and right projections forming a cross. A mounting bracket can be connected to either the upward or downward projection so that the holster can be suspended from or supported by the video box or held upright in a free-standing arrangement. The holsters are modular and can be stacked vertically or connected laterally using back-to-back collars to achieve an assembly to store any desired number of controllers. The distance between rods extending from the left and right projections to support a controller can be adjusted to accommodate a variety of differently structured controllers.

14 Claims, 5 Drawing Sheets

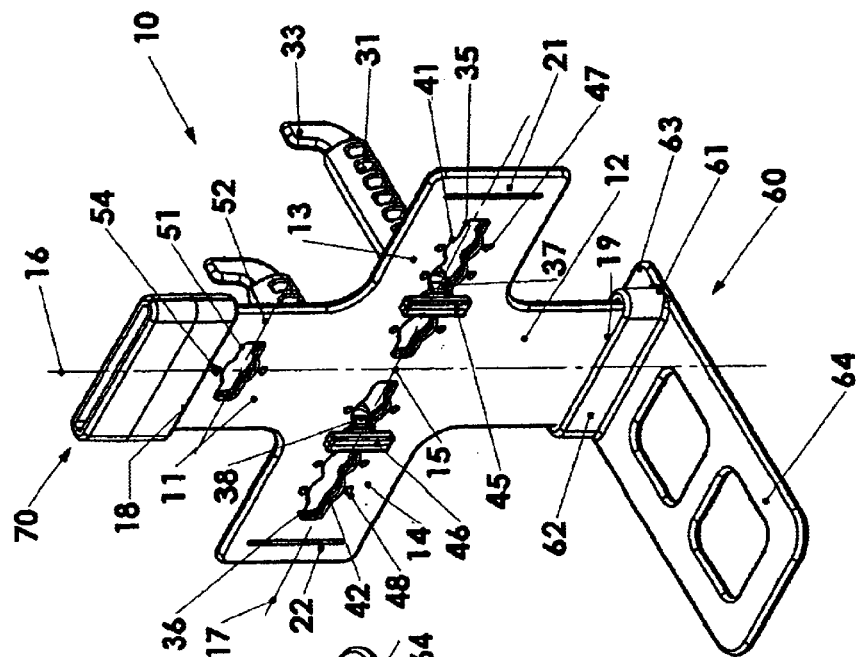
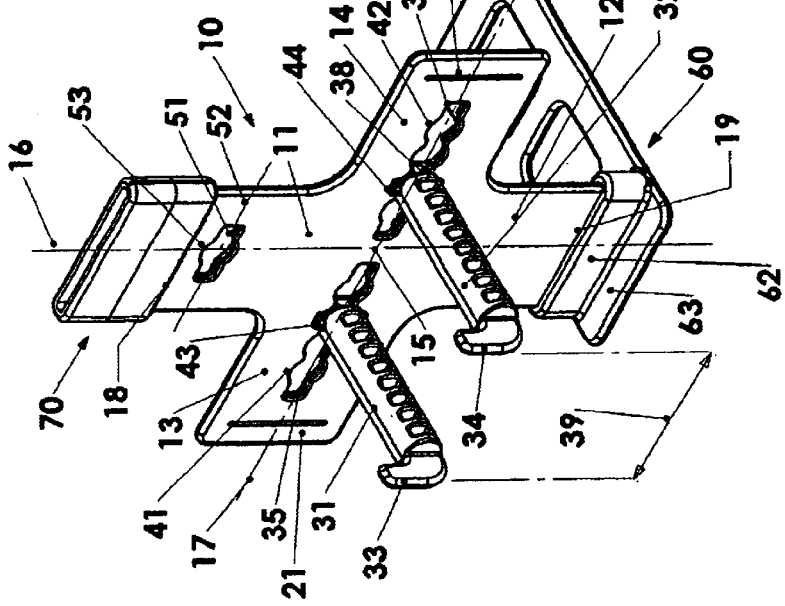

VIDEO GAME CONTROLLER HOLSTER

BACKGROUND OF THE INVENTION

This invention relates generally to video game accessories and more particularly concerns a holster for a video game controller.

Video games typically involve one to four players, each of whom has a separate controller. The family video center is, therefore, when video games are not being played, a tangle of wires and randomly discarded controllers. Generally, the next game players are left with the task of untangling the mess before they can play, unless someone else volunteers their time to straighten the mess while the games are not in use. The tangle is usually left on the floor, so the wires are sometimes caught up in feet, usually of younger children, which pull the cords and jerk or step on the controllers, damaging them beyond use.

It is, therefore, an object of this invention to provide a video game controller holster for storing a controller when it is not in use. Another object of this invention is to provide a video game controller holster which is laterally connectable to identical holsters to create a single assembly for storing more than one controller. A further object of this invention is to provide a video game controller holster which is vertically stackable with identical holders to create a single assembly for storing more than one controller. Yet another object of this invention is to provide a video game controller holster which has controller supports which are adjustable to accommodate a variety of differently structured controllers. It is also an object of this invention to provide a video game controller holster which can be suspended by a bracket from the top of a video box or monitor, supported by a bracket on which the bottom of a video box or monitor is seated or maintained by a bracket in a free standing condition. Another object of this invention is to provide a video game controller holster which is adaptable to store a headset associated with the video game.

SUMMARY OF THE INVENTION

In accordance with the invention, a holster is provided for storing a video game controller.

A cross has projections which extend outwardly from the intersection of vertical and horizontal axes. Each projection ends in a neck and all the necks are dimensioned and located isometrically in relation to their respective axes. A pair of spaced-apart rods, one extending forwardly from each of the left and right projections of the cross, support the controller. Each rod has a detent on its forward end to prevent the controller from sliding off the rods.

A mounting bracket has a slat. A first collar is fixed on and divides the slat into forward and rearward tongues. The collar has an interior contour complimentary to a contour of the isometric necks so that the bracket may be coupled to any neck of the cross inserted in the collar. Thus, the bracket can be connected to the uppermost projection so that the holster can be suspended by the rearward tongue, perhaps from the top of the video box, or connected to the lowermost projection so that the holster can be supported by the rearward tongue, perhaps by resting the bottom of the video box on the tongue or simply held upright by the forward and rearward tongues in a free-standing arrangement.

A second collar has back-to-back interior contours complimentary to the contour of the isometric necks so that any cross may be coupled to one or more identical crosses by inserting one of the necks of the cross and one of the necks of the identical cross into the back-to-back interior contours. Thus, holsters can be stacked vertically or connected laterally using the back-to-back collar. Any number of holsters can be connected to hold the desired number of controllers. In the vertical arrangement, one bracket will suspend or support all of the holsters. In the lateral arrangement, multiple brackets can be used to suspend or support the assembly.

Preferably, the horizontal projections of the cross each have an elongated slot. The slots are aligned on a common horizontal axis and the rearward ends of the rods are engagable in the slots. This allows the distance between the rods to be varied to accommodate a variety of differently structured controllers. In one preferred embodiment, the slots have widened segments at intervals and the rods have elliptical cross-sections so that the rearward ends of the rods may be rotatively engaged in and disengaged from the widened segments. Prongs on the rods engage with the front and back surfaces of the cross projections when the rods are rotated in the slots to a position in which the detents on the rods are extending upwardly. This strengthens the assembly. The rod prongs and the cross projections may have complementary dimples and nodules on their faces so that the rods will be locked in engagement in the slots when the detents are upwardly oriented.

The upward projection may also be provided with a slot aligned on a horizontal axis so that one of the rods can be forwardly extended from it, perhaps to support a set of earphones or other accessory. This slot may also have a widened segment so that the rearward end of the rod may be rotatively engaged in and disengaged from the widened segment.

It is preferable for balance that the vertical axis bisects the cross. For the same reason, the cross is preferably symmetrical about the vertical axis. To allow the cross to be used with its up side up or down, it is also preferable that the horizontal axis bisects the cross.

BRIEF DESCRIPTION OF THE DRAWINGS

Other objects and advantages of the invention will become apparent upon reading the following detailed description and upon reference to the drawings in which:

FIG. 1 is a front perspective view of a preferred embodiment of the video game controller holster configured to be bottom-supported;

FIG. 2 is a rear perspective view of the holster of FIG. 1;

Figure 3:
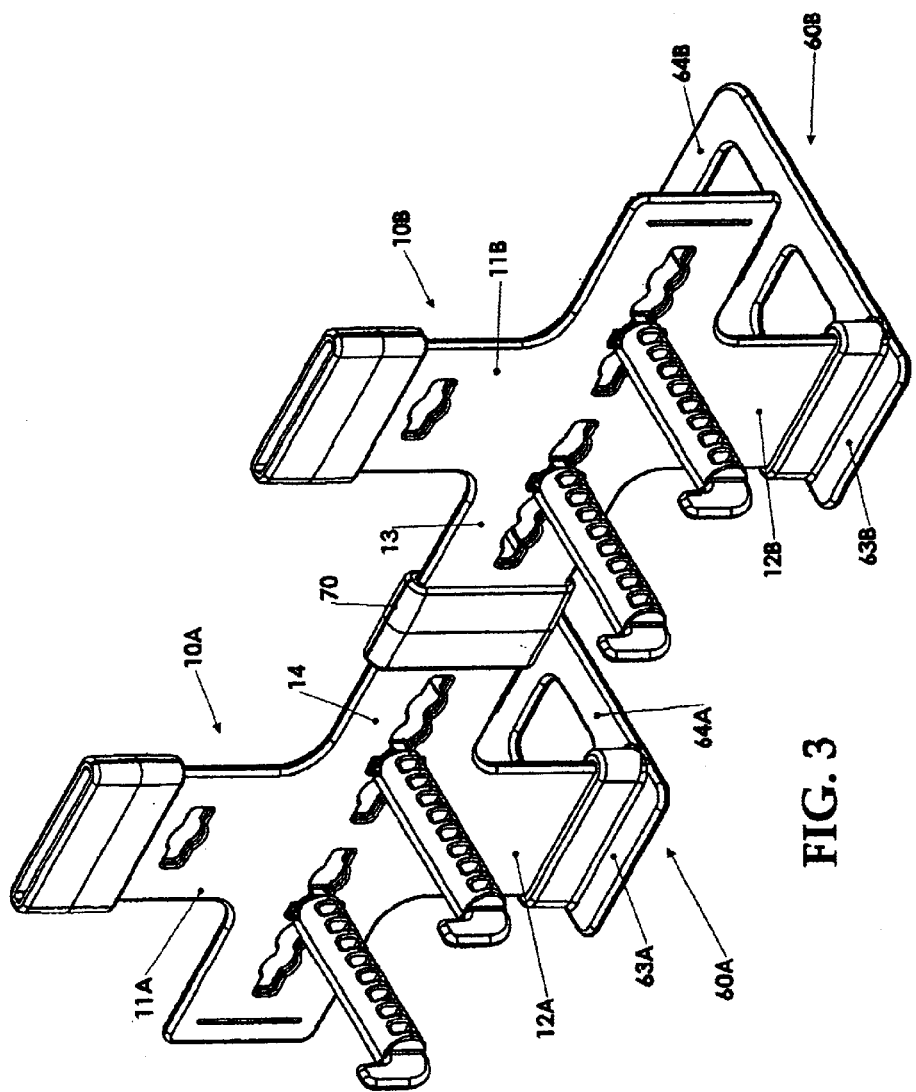
FIG. 3 is a front perspective view of two video game controller holsters connected laterally.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning first to FIGS. 1 and 2, a holster for a video game controller is illustrated. A cross 10 has upward 11, downward 12, left 13 and right 14 projections extending outwardly from an intersection 15 of vertical and horizontal axes 16 and 17, respectively. Each of the projections 11, 12, 13 and 14, ends in a neck 18, 19, 21 and 22, respectively. All of the necks 18, 19, 21 and 22 are isometrically dimensioned or identical. They are also isometrically located in relation to their axes 16 and 17. Thus, the vertical necks 18 and 19 are vertically aligned and the horizontal necks 21 and 22 are horizontally aligned. In the preferred embodiment as shown, the vertical axis 16 bisects the cross 10 and the cross 10 is symmetrical about the vertical axis 16. Similarly, the horizontal axis 17 bisects the cross 10. However, while this is preferred to provide balance in an assembly of multiple crosses 10 as is hereinafter discussed, this is not necessary provided the vertical necks 18 and 19 are aligned with each other and identically dimensioned and the horizontal necks 21 and 22 are aligned with each other and identically dimensioned.

The cross 10 has a pair of spaced apart rods 31 and 32 extending forwardly from the left and right projections 13 and 14, respectively. The controller (not shown) will be supported on the holster by resting the controller on the rods 31 and 32. The typical controller has an elongated body with transverse wraps and the wraps will be seated on the rods 31 and 32 with body extending downwardly between the rods 31 and 32. Each of the rods 31 and 32 has a detent 33 and 34, respectively, extending upwardly at its forward end to prevent the controller from sliding in a forward direction off the rods 31 and 32. In the preferred embodiment shown, each of the horizontal projections 13 and 14 has an elongated slot 35 and 36, respectively, extending through it. As shown, the slots 35 and 36 are aligned on the horizontal axis 17 of the horizontal projections 13 and 14. However, the axis of the slots 35 and 36 need not be coincident with the horizontal axis 17. As shown, the rearward ends 37 and 38 of the rods 13 and 14 are engagable in the slots 35 and 36 so that the distance 39 between the rods can be varied. This permits the holster to be adapted to accommodate any of a variety of differently structured controllers (not shown). Furthermore, in the preferred embodiment shown, each of the slots 35 and 36 has a plurality of widened segments or portions 41 and 42, respectively, dispersed at intervals along the length of the slots 35 and 36. Furthermore, the rearward ends 37 and 38 of the rods 31 and 32 are approximately elliptical in cross-section so that they can be inserted into the widened segments 41 and 42 with the detents 33 and 34 aligned horizontally and rotatively engaged in or disengaged from the widened segments 41 and 42 as the rods 31 and 32 are rotated to align the detents 33 and 34 in an upward orientation. In the preferred embodiment shown, the rods 31 and 32 have forward prongs 43 and 44 and rearward prongs 45 and 46 which engage with the front and back surfaces of the left and right projections 13 and 14 of the cross 10 when the rods 31 and 32 are engaged in the slots 35 and 36 with their detents 33 and 34 in the upward orientation. Finally, as best seen in FIG. 2, the prongs 45 and 46 and left and right projections 13 and 14 are provided with complementary dimples and nodules 47 and 48 so that the rods 31 and 32 can be locked in engagement in the slots 35 and 36 when the detents 33 and 34 are aligned in the upward orientation.

Continuing to look at FIGS. 1 and 2, the cross 10 may also have a slot 51 aligned on a horizontal axis 52 through the upward projection 11. One of the rods 33 or 34 or an identical rod can be forwardly extended from the upward projection 11 of the cross 10. Thus, the holster can be optionally used to support a set of earphones (not shown) or other accessory related to the video game. As shown, the slot 51 has a widened segment 53 which is cooperable with the inserted rod as hereinbefore explained so that use of the rod is optional. The upward projection 11 may also be provided with dimples or nodules 54 complementary to nodules or dimples on the rod prongs 45 and 46 to lock the rod in engagement with the slot 51 in similar fashion as explained with respect to the slots 35 and 36.

The cross 10 has a mounting bracket 60 consisting of a slat 61 with a collar 62 integrally extending from or fixed to the slat 61 and dividing the slat 61 into forward and rearward tongues 63 and 64, respectively. The collar 62 has an interior contour which is complementary to the contour of the isometric necks 18, 19, 21 and 22 so that the bracket 60 can be coupled to any neck, 18, 19, 21 or 22 of the cross by inserting one of the necks 18, 19, 21 or 22 into the interior contour of the collar 62. As shown, the rearward tongue 64 is considerably longer than the forward tongue 63. As will hereinafter be explained, it is desirable that the rearward tongue 64 be at least as long as the rods 31 and 32.

The holster also includes a second collar 70 which has back-to-back interior contours complementary to the contour of the isometric necks 18, 19, 21 and 22. Thus, the back-to-back collar 70 can be mounted on any of the necks 18, 19, 21 or 22 by inserting the neck 18, 19, 21 or 22 into one of the interior contours of the collar 70. The cross 10 can then be coupled to an identical cross 10 by inserting one of the necks 17, 18, 19, 21 or 22 of the second cross 10 into the other of the back-to-back interior contours of the collar 70.

Looking at FIG. 3, crosses 10A and 10B are coupled in a lateral configuration usable to support two controllers (not shown). The crosses 10A and 10B have their brackets 60A and 60B mounted on their downward projections 12A and 12B with their forward tongues 63A and 63B extending forwardly and their rearward tongues 64A and 64B extending rearwardly. The right projection 14 of one cross 10A is connected to the left projection 13 of the other cross 10B by one of the back-to-back collars 70. Thus, a single assembly results which can be used to support two controllers (not shown). Optimally, by placing one of the rods of one of the crosses 10A or 10B in its upward projection 11A or 11B, the assembly could be used to support a controller and an associated headset (not shown). In this configuration, with the rearward tongues 64A and 64B extending rearwardly from their respective crosses 10A and 10B, the video box or other proximate equipment (not shown) can be seated atop the rearward tongues 64A and 64B with the tongues 64A and 64B resting on a flat surface so as to clamp or support the crosses 10A and 10B in an upright orientation. This two cross arrangement is exemplary. Any number of crosses can be laterally serially connected in similar fashion.

Figure 4:
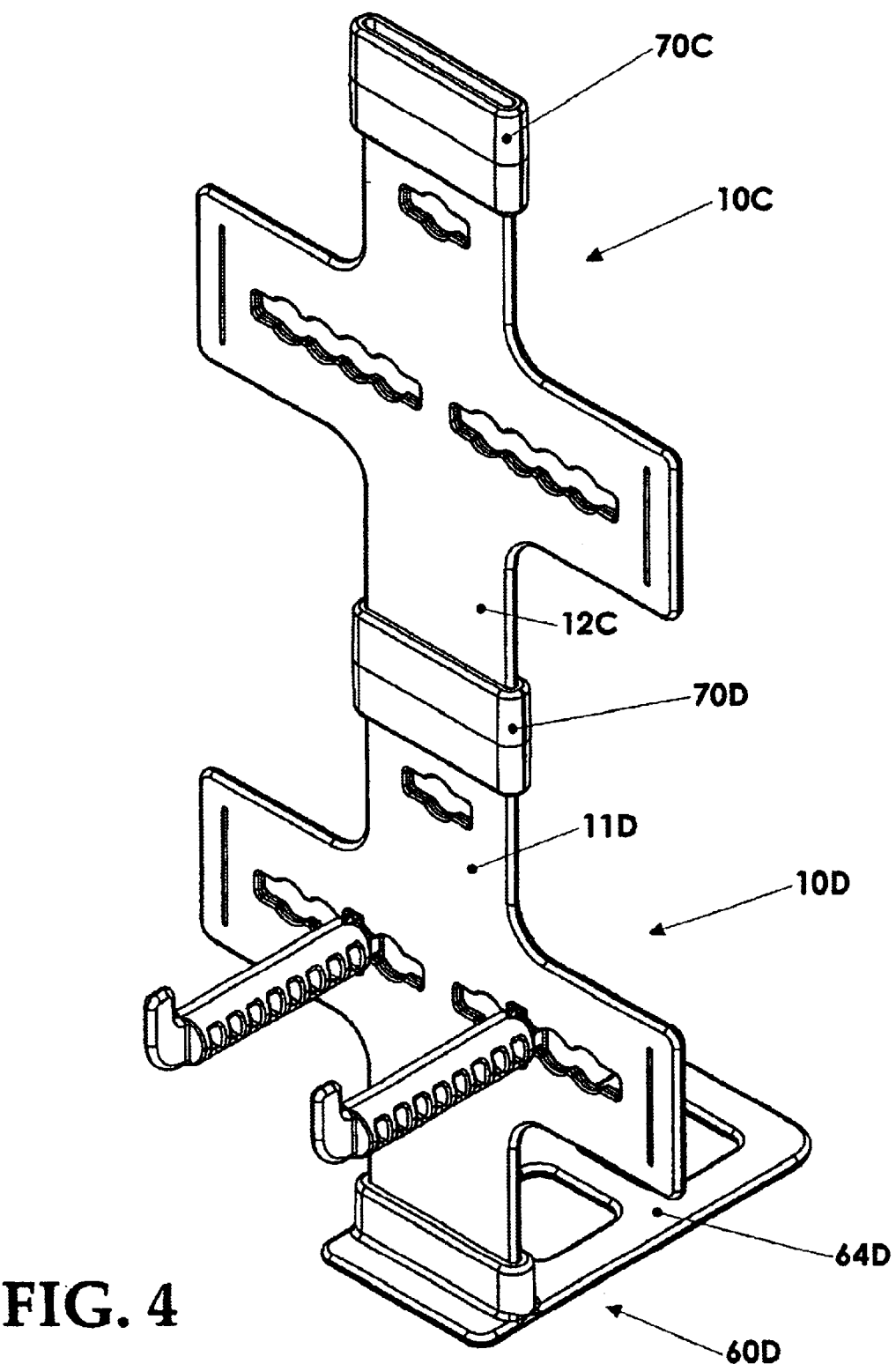
FIG. 4 is a front perspective view of two video game controller holsters stacked vertically.

Turning to FIG. 4, crosses 10C and 10D are coupled in a vertically stacked configuration. One cross 10C has its downward projection 12C connected to the upward projection 11D of the other cross 10D by one of the back-to-back collars 70. The vertically stacked crosses 10C and 10D can be supported by a single bracket 60D. By use of additional back-to-back collars 70, any number of crosses 10 can be vertically stacked in the arrangement. In the configuration illustrated in FIG. 4, the assembly of crosses will be clamped or supported in an upright orientation by resting the video box or other convenient component (not shown) on top of the rearward tongue 64D of the bottom cross 10D, as explained in relation to FIG. 3.

Figure 5:
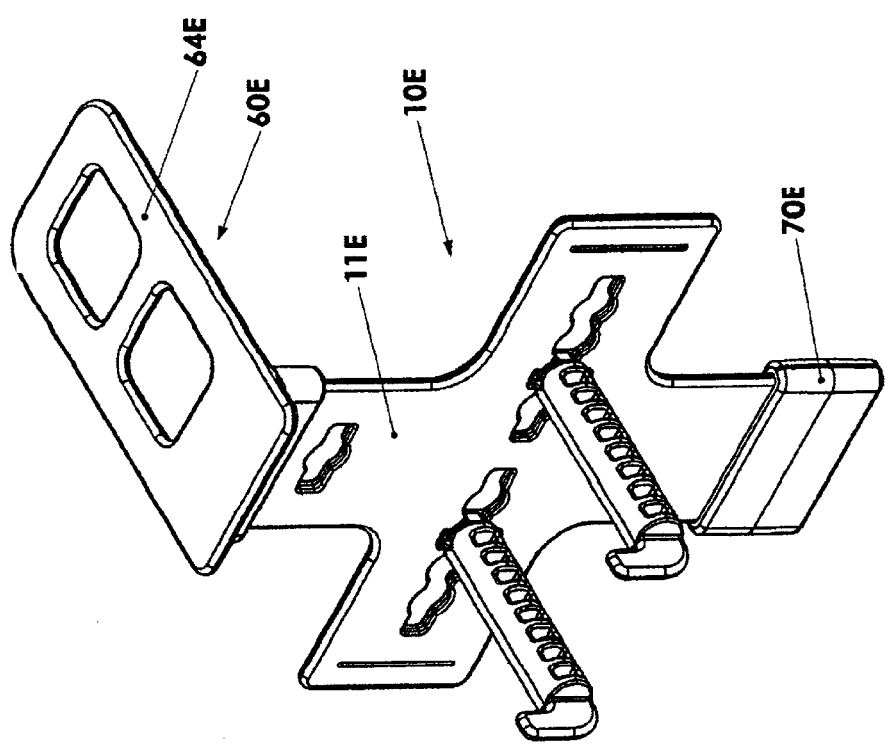
FIG. 5 is a front perspective view of a holster configured to be top-suspended.

Turning to FIG. 5, a cross 10E or assembly of crosses can be suspended from a video box or other available equipment (not shown) by mounting the bracket 60E to the upward projection 11E with the rearward tongue 64E extending rearwardly in relation to the cross 10E. Thus, the rearwardly extending tongue 64E can be rested on top of the video box or other equipment (not shown) with the cross 10E downwardly suspended from the bracket 60E. Additional crosses can be stacked below the cross 10E by use of back-to-back collars 70 as illustrated in FIG. 4.

The suspended arrangement can also be used in conjunction with a lateral arrangement of crosses as illustrated in FIG. 3. More than one upward projection 11 can be provided with a bracket 60 and each bracket 60 can be rested on top of the video box or other equipment (not shown). Thus, the assembly can be suspended from rather than supported by the video box or other equipment (not shown).

Figure 6:
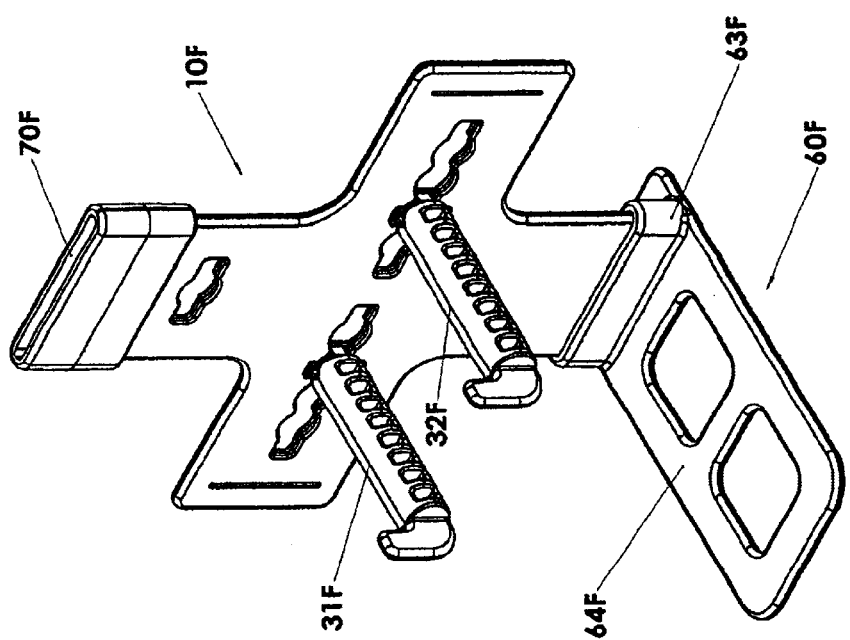
FIG. 6 is a front perspective view of a holster configured to be free-standing.

Looking now at FIG. 6, it will be seen that the bracket 60F associated with a cross 10F can be reversed so that the forward tongue 63F extends rearwardly and the rearward tongue 64F extends forwardly of the cross 10F. The longer rearward tongue desirably extends forwardly at least for the length of the rods 31F and 32F to assure that the center of gravity of the supported controller (not shown) will be above the rearward tongue 64F, thus providing a stable free-standing arrangement of the holster. This free-standing arrangement is applicable to assemblies of multiple holsters as well, as by use of the coupler 70F.

From the above description, it will be seen that the holster is configured so as to enable any number of holsters to be laterally connected or vertically stacked to accommodate a desired number of controllers and/or controller accessories, such as headphones. Furthermore, any lateral or stacked assembly of multiple holders can be suspended from, supported by or free-standing on a bracket. The spacing of the rods can be adjusted to accommodate any of a variety of differently structured controllers. The cross 10, rods 31 and 32, brackets 60 and collar 70 are preferably made of a substantially rigid plastic. The rods or brackets or collars may be integrally formed in the cross. For example, a bracket may be integral with the downward projection and a collar integral with one of the lateral projections if only lateral assemblies are desired.

Thus, it is apparent that there has been provided, in accordance with the invention, a video game controller holster that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A holster for a video game controller comprising:
   a cross having left and right and up and down projections extending outwardly from an intersection of vertical and horizontal axes, respectively, each said projection ending in a neck, all of said necks being dimensioned and located isometrically in relation to their axes;
   a pair of spaced-apart rods, one extending forwardly from each of said left and right projections, for supporting the controller thereon, each said rod having a detent on a forward end thereof for preventing the controller from sliding off said rods;
   a mounting bracket having a slat with a first collar fixed on and dividing said slat into forward and rearward tongues, said collar having an interior contour complimentary to a contour of said isometric necks whereby said bracket may be coupled to any one of said necks inserted in said collar; and
   a second collar having back-to-back interior contours complimentary to said contour of said isometric necks whereby said cross may be coupled to an identical cross by inserting any one of said necks of said cross and any one of the necks of the identical cross into said back-to-back interior contours.

2. A holster according to claim 1, horizontal ones of said projections each having an elongated slot therethrough, said slots being aligned on a common horizontal axis, said rods having rearward ends thereof engagable in said slots whereby a distance between said rods can be varied.

3. A holster according to claim 2, said slots having a plurality of widened segments at intervals therealong and said rods having an elliptical cross-section whereby said rearward ends of said rods may be rotatively engaged in and disengaged from said widened segments.

4. A holster according to claim 3, said rods having prongs engagable with front and back surfaces of said horizontal ones of said projections when said rods are engaged in said slots and said detents are extending upwardly.

5. A holster according to claim 4, said prongs and said horizontal ones of said projections, at each of said widened segments, having complementary dimples and nodules whereby said rods may be locked in engagement in said slots with said detents upwardly oriented.

6. A holster according to claim 2, an upper vertical one of said projections having a slot therethrough, said slot being aligned on a horizontal axis whereby one of said rods can be forwardly extended from said upper vertical projection.

7. A holster according to claim 6, said slot having a widened segment therealong and each said rod having an elliptical cross-section whereby said rearward end of one of said rods may be rotatively engaged in and disengaged from said widened segment.

8. A holster according to claim 7, each said rod having prongs engagable with front and back surfaces of said upper vertical projection when said rod is engaged in said slot and said detent is extending upwardly.

9. A holster according to claim 8, said prongs and said upper vertical projection, at said widened segment, having complementary dimples and nodules whereby said rod may be locked in engagement in said slot with said detent upwardly oriented.

10. A holster according to claim 1, said vertical axis bisecting said cross.

11. A holster according to claim 10, said cross being symmetrical about said vertical axis.

12. A holster according to claim 1, said horizontal axis bisecting said cross.

13. A holster for a video game controller comprising:
   a cross;
   a pair of spaced-apart rods extending forwardly from left and night projections of said cross for supporting the controller thereon, each said rod having a detent on a forward end thereof for preventing the controller from sliding off said rods;
   a mounting bracket having a collar with an interior contour complimentary to a contour of outward ends of upward and downward projections of said cross whereby said bracket may be coupled to one of said upward and downward projections; and
   a second collar having back-to-back interior contours complimentary to contours of outward ends of said left and right projections of said cross whereby a first cross may be coupled to an identical second cross by inserting an outward end of a right projection of said first cross and an outward end of a left projection of said second cross into their respective said complimentary contours of said collar.

14. A holster according to claim 13 further comprising a third collar having back-to-back interior contours complimentary to said contour of said outward ends of said upward and downward projections of said cross whereby a first cross may be coupled to an identical second cross by inserting said outward end of said upward projection of said first cross and said outward end of said downward projection of said second cross into said complimentary contours of said collar.

* * * * *